(12) United States Patent
Lee et al.

(10) Patent No.: US 11,448,300 B1
(45) Date of Patent: Sep. 20, 2022

(54) SEALED PLANETARY DIFFERENTIAL

(71) Applicant: Schaeffler Technologies AG & Co. KG, Herzogenaurach (DE)

(72) Inventors: Brian Lee, York, SC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/347,635

(22) Filed: Jun. 15, 2021

(51) Int. Cl.
| *F16H 48/40* | (2012.01) |
| *F16H 48/11* | (2012.01) |
| *F16H 57/04* | (2010.01) |
| *F16H 57/029* | (2012.01) |

(52) U.S. Cl.
CPC ............ *F16H 48/11* (2013.01); *F16H 48/40* (2013.01); *F16H 57/0426* (2013.01); *F16H 57/0482* (2013.01); *F16H 57/029* (2013.01); *F16H 57/0483* (2013.01)

(58) Field of Classification Search
CPC ...... F16H 48/11; F16H 48/40; F16H 57/0426; F16H 57/0482; F16H 57/0483; F16H 2048/382; F16H 57/029
See application file for complete search history.

(56) References Cited

U.S. PATENT DOCUMENTS

| 2,869,399 | A | * | 1/1959 | Miles | F16H 48/08 475/85 |
| 2,978,929 | A | * | 4/1961 | Roberts | F16H 48/08 475/89 |
| 3,314,306 | A | | 4/1967 | Barclae | |
| 3,719,253 | A | * | 3/1973 | Dukes et al. | F16H 57/0434 184/6.12 |
| 5,584,777 | A | * | 12/1996 | Sander | F16H 57/08 74/606 R |
| 6,413,183 | B1 | * | 7/2002 | Ishikawa | F16H 48/22 475/160 |
| 7,980,157 | B2 | * | 7/2011 | Krude | F16H 48/08 74/606 R |
| 9,103,427 | B2 | * | 8/2015 | Downs | F16H 48/08 |
| 9,797,496 | B2 | * | 10/2017 | Martin | F16H 48/40 |
| 2009/0266198 | A1 | * | 10/2009 | Nosakowski | F16H 48/08 74/606 R |

FOREIGN PATENT DOCUMENTS

| CN | 202228634 | U | | 5/2012 | |
| DE | 3726986 | A1 | * | 2/1989 | |
| DE | 4027368 | A1 | * | 3/1992 | |
| GB | 2050539 | A | * | 1/1981 | ............ F16H 48/10 |
| JP | 62132054 | A | * | 6/1987 | |
| JP | 2002081525 | A | | 3/2002 | |
| JP | 2009097716 | A | * | 5/2009 | ............ F16H 48/08 |
| WO | 8602419 | A1 | | 4/1986 | |
| WO | WO-2016055255 | A1 | * | 4/2016 | ............ F16H 48/40 |

* cited by examiner

*Primary Examiner* — Sherry L Estremsky

(57) ABSTRACT

A differential is sealed such that it retains its own lubrication fluid supply. The carrier housing is formed from two carrier halves which are welded together. One carrier half has an inner axial extension which is radially inside an outer axial extension of the other half. A circumferential weld is placed between the outer axial extension and the first carrier half. One of the stub shafts has an end cap with a one-way valve to allow fluid to be added after the welding is completed.

10 Claims, 4 Drawing Sheets

SEALED PLANETARY DIFFERENTIAL

TECHNICAL FIELD

The disclosure pertains to a vehicular differential assembly. More particularly, the disclosure pertains to a differential assembly that is sealed to contain its own supply of lubricating fluid.

BACKGROUND

When a vehicle travels along a curved path, such as when it turns a corner, the outside wheels travel further than the inside wheels. Therefore, the outside wheels must either rotate faster than the inside wheels or one of the wheels must skid or slip. Differentials are designed to distribute power to two wheels while not forcing the wheels to rotate at the same speed. Specifically, a differential distributes power from an input to two half-shafts where each half-shaft is rotationally fixed to a wheel. An open, unbiased differential supplies equal torque to each half-shaft. The differential constrains the average speed of the half-shafts to be proportional to the speed of the input.

Conventionally, a differential is located inside a sealed housing such as a transaxle housing or a rear axle housing. A conventional differential is lubricated by circulation of fluid from the outer housing through the differential gearing and back to the outer housing. The fluid circulation may be forced by a pump or may rely on capture of splashed from a sump. The selection of fluid may be dictated by the needs of other components that share the same outer housing.

SUMMARY

A sealed differential includes a carrier housing, first and second stub shafts, and gearing. The carrier housing defines a sealed cavity. The carrier housing may include first and second carrier halves. The first carrier half may have an inner axial extension The second carrier half may have an outer axial extension radially outside the inner axial extension. The first and second carrier halves may be welded together with a circumferential weld between the first carrier half and a tip of the outer axial extension. The first and second stub shafts are each supported for rotation with respect to the carrier housing. The sealed first and second stub shafts may be hollow and have internal spline teeth configured to rotationally couple the stub shafts with corresponding half shafts. The gearing constrains a speed of the first stub shaft with respect to the carrier housing to be equal in magnitude and opposite in direction to a speed of the second stub shaft with respect to the carrier housing. The gearing may include first and second sun gears, a plurality of first planet gears, and a plurality of second planet gears. The first and second sun gears may be fixed to the first and second stub shafts respectively. The plurality of first planet gears may be supported for rotation with respect to the carrier housing and may mesh with the first sun gear. The plurality of second planet gears may supported for rotation with respect to the carrier housing and may mesh with the second sun gear and one of the first planet gears. A one-way valve may permit fluid to flow through the first stub shaft into the cavity and block fluid flow from the cavity.

A method of assembling a differential may include installing a first stub shaft, installing a second stub shaft, installing gearing, welding two carrier halves together, and partially filling a sealed cavity with fluid. The first stub shaft is installed in a first carrier half in a manner that creates a first seal but permits relative rotation. Similarly, the second stub shaft is installed into a second carrier half in a manner that creates a second seal but permits relative rotation. The gearing constrains the first and second stub shafts to rotate in opposite directions at equal speeds with respect to the respective carrier halves. The first carrier half is welded to the second carrier half to define the sealed closed cavity, which is partially filling via a one-way valve in the first stub shaft. The first carrier half may have an inner axial extension. The second carrier half may have an outer axial extension radially outside the inner axial extension. The weld may be between the first carrier half and a tip of the outer axial extension.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
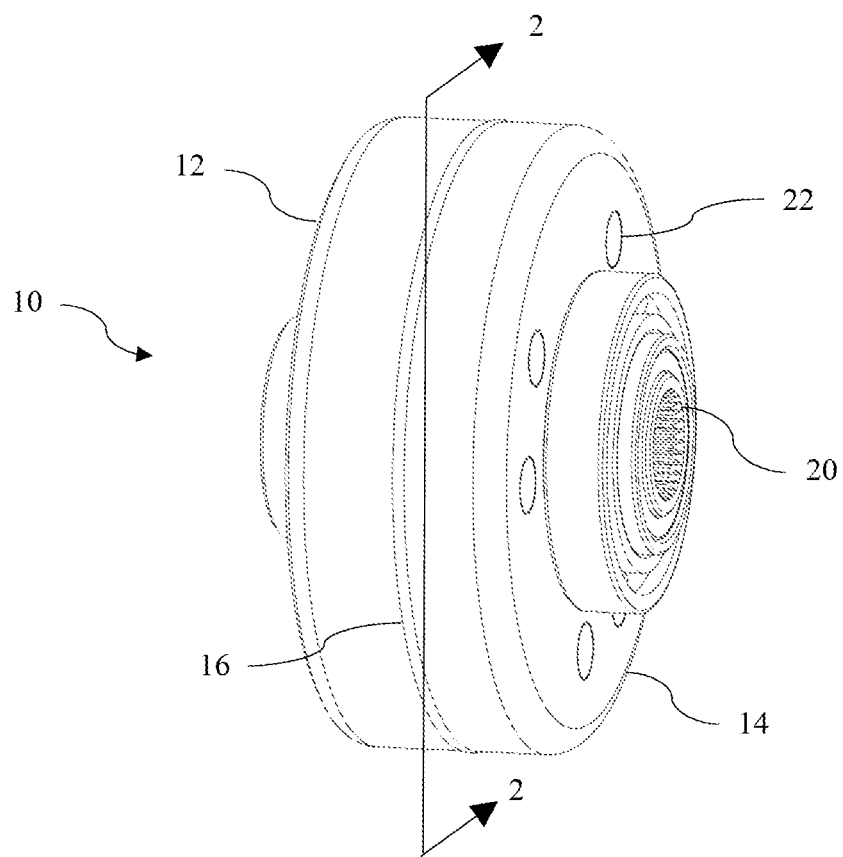
FIG. 1 is a pictorial view of a sealed differential.

FIG. 1 shows a sealed differential 10. Unlike conventional differentials which are typically contained within another sealed housing, the carrier housing of the differential itself is sealed such that the differential can utilize its own supply of lubrication fluid. The carrier housing includes a first carrier half 12 and a second carrier half 14 which are welded together at 16. Two stub shafts 18 and 20 are supported for rotation with respect to the carrier housing about a central axis. (Stub shaft 18 is not visible in FIG. 1.) Each carrier half includes a number of holes which receive planet shafts 22.

Figure 2:
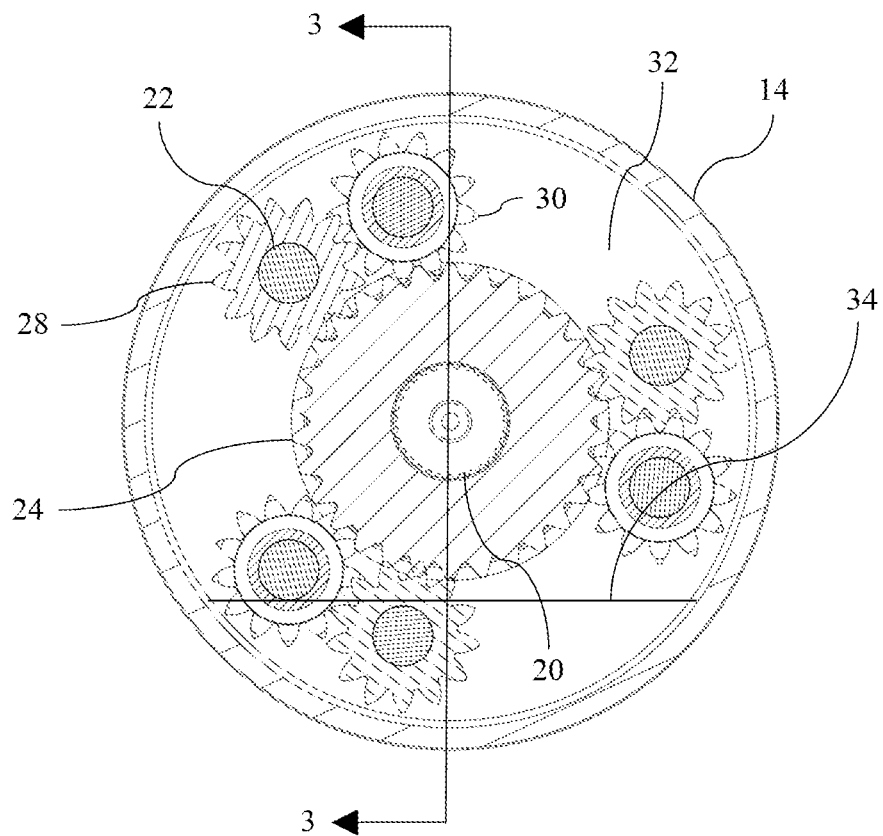
FIG. 2 is a cross sectional view of the sealed differential of FIG. 1.

FIG. 2 shows a cross-sectional view of the sealed differential. A sun gear 24 is fixed to stub shaft 20. Another sun gear 26 is fixed to the other stub shaft 18 (not visible in FIG. 2.) A first set of planet gears 28 are supported to rotate on the planet pins 22. The first planet gears 28 mesh with sun gear 24. A second set of planet gears 30 are supported to rotate on the planet pins 22. The second planet gears 30 mesh with sun gear 26. Additionally, each first planet gear 28 meshes with one of the second planet gears 30. When sun gear 24 rotates with respect to the differential carrier, these gears force sun gear 26 to rotate in the opposite direction at the same speed with respect to the carrier. The speed of each stub shaft with respect to the carrier housing is always constrained to be opposite in direction and equal in magnitude to the speed of the other stub shaft with respect to the carrier housing. When the speed of one of the stub shafts with respect to the housing is zero, the speed of the other stub shaft with respect to the housing is zero. When the carrier itself is rotating, its speeds is an average of the speeds of the sun gears (treating rotation in an opposite direction as a negative value). A sealed cavity 32 is formed within the differential carrier. Fluid 34 is contained within this cavity to provide lubrication. The fluid 34 does not flow into and out of the cavity during operation, but instead remains contains within the cavity and separated from any fluid that may be on the outside of the differential carrier.

Figure 3:
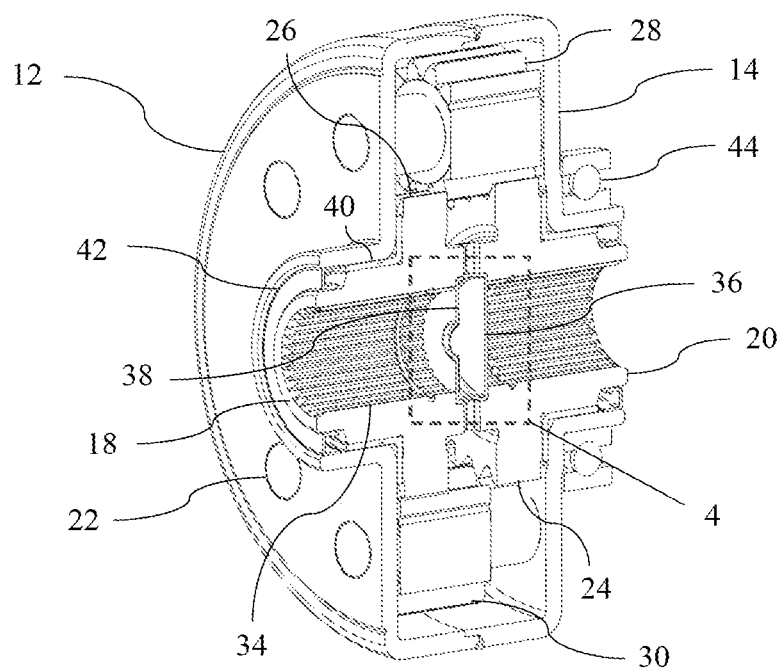
FIG. 3 is a cut-away view of the sealed differential of FIG. 1.

FIG. 3 is a cut-away view of the sealed differential. Sun gear 24 is integrally formed with stub shaft 20. Similarly, sun gear 26 is integrally formed with stub shaft 18. The interior surface of each stub shaft has a spline 34 to receive a half-shaft. The two stub shaft/sun gear assemblies may be identical in design to one another. A solid spline cap 36 seals the inner end of one of the stub shafts. The inner end of the other stub shaft is fitted with a spline cap 38 that includes a one-way valve. As described in more detail below, the one-way valve allows fluid to flow into the cavity 32 but prevent fluid from flowing out of the cavity. Each stub shaft is supported with respect to the carrier housing by a bushing 40. A seal 42 may be installed between the stub shaft and the carrier housing. The carrier housing is supported for rotation with respect to another housing (not shown) by at least one bearing 44.

Figure 4:
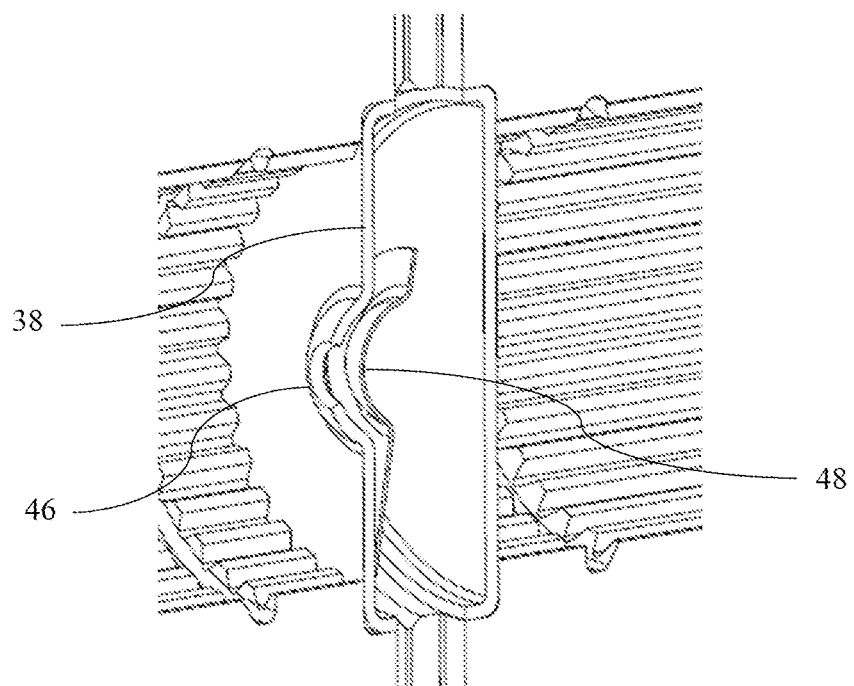
FIG. 4 is a detail view of FIG. 3.

FIG. 4 is a detail view showing the one-way valve in spline cap 38. The spline cap 38 defines an aperture 46. Hinged plate 48 is spring loaded to a position in which it covers aperture 46, thereby preventing fluid from leaving the cavity. When the pressure in the hollow stub shaft exceeds the pressure in the cavity, the hinged plate 48 moves to the position illustrated in FIG. 4, allowing fluid to flow from the hollow stub shaft into the cavity. The fluid will then tend to flow between the sun gears into lowest part of the cavity due to gravity. Air pressure can be equalized between the cavity and the environment by inserting a small tool through the aperture 46 to briefly push the hinged plate 48 into the position shown in FIG. 4.

Figure 5:
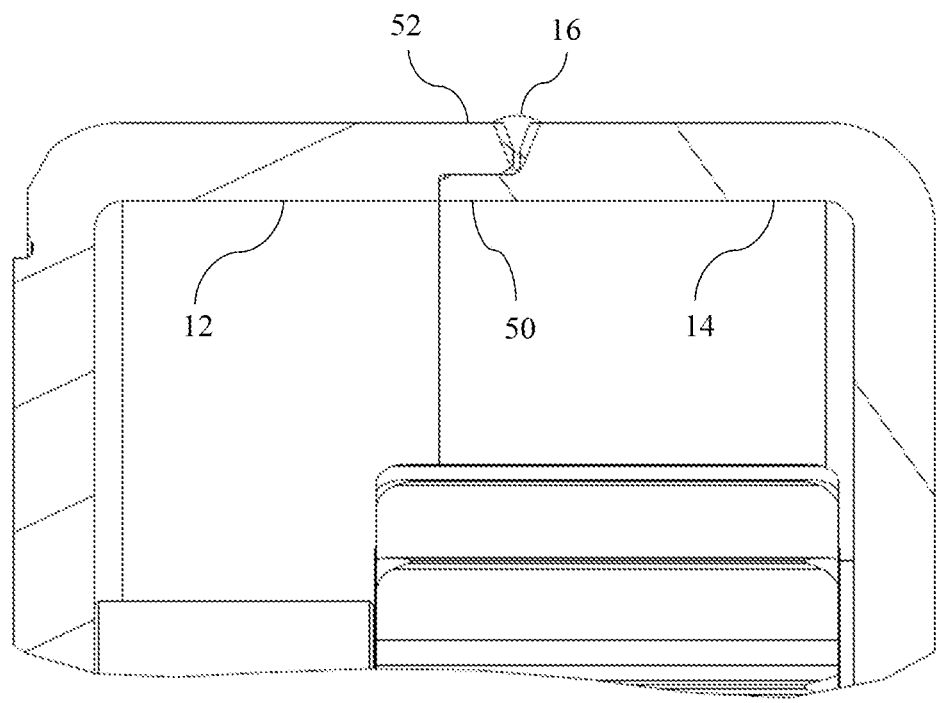
FIG. 5 is a detail cross sectional view of the sealed differential of FIG. 1.

FIG. 5 is a detail cross-sectional view showing the weld. Carrier half 14 has an inner axial extension 50 and carrier half 12 has an outer axial extension 52. Outer axial extension 52 radially overlaps inner axial extension 50. The circumferential weld 16 directly joins the outer axial extension 52 to a face of carrier half 14 adjacent to inner axial extension 50. During the welding process, the inner axial extension shields the components inside the carrier housing from the heat.

Figure 6:
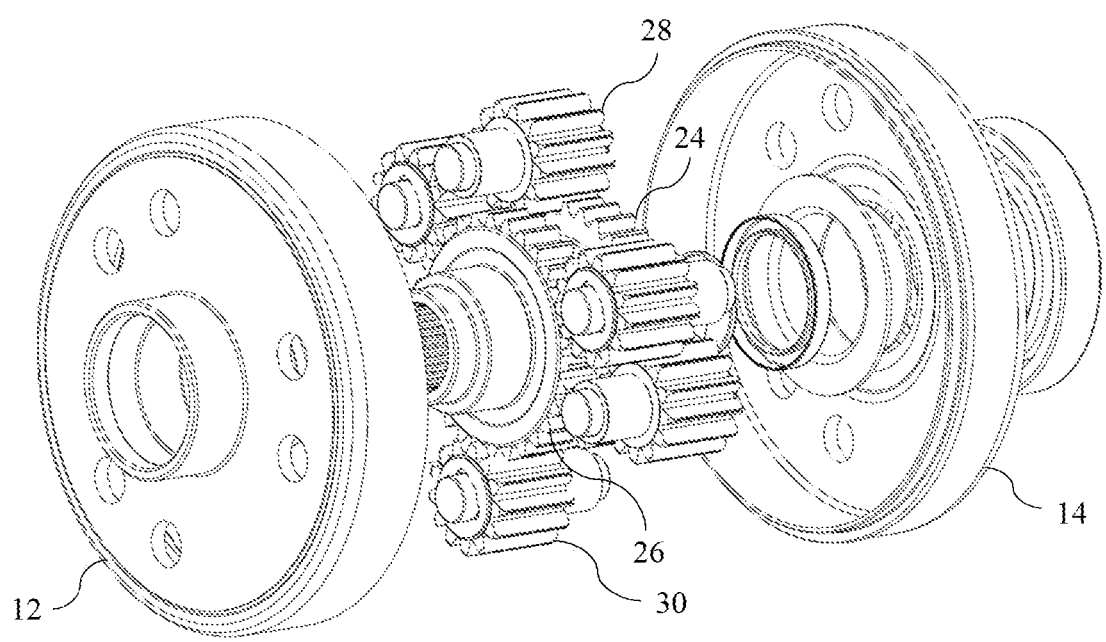
FIG. 6 is an exploded view of the sealed differential of FIG. 1.

FIG. 6 is an exploded view of the sealed differential. Most of the assembly steps may be visualized from this view. The differential is assembled as follows:

Insert a solid spline cap in one stub shaft and a spline cap with a one-way valve in the other stub shaft.

Place the first carrier half on a table, cavity side up.

Install the first stub shaft/sun gear, including the bushing.

Install the first set of planet gears such that they mesh with the first sun gear. At this point, only one end of the planet gear shaft is supported.

Install the second set of planet gears such that each one meshes with one of the first planet gears. At this point, only one end of the planet gear shaft is supported.

Install the second sun gear such that it meshes with each of the second planet gears. Place the bushing over the stub shaft.

Place the second carrier half over the second stub shaft. Rotate the second carrier half to line up the holes with the planet gear shafts and then lower the second carrier half such that the planet gear shafts extend into the holes. The outer axial extension should be aligned with and extend over the inner axial extension.

Weld the two carrier halves together as illustrated in FIG. 5.

Install the seals between the stub shafts and the carrier housing.

Place the assembly on a table such that the stub shaft with the one-way valve is on top.

Fill the cavity with a desired quantity of fluid through the one-way valve.

A designer of a system, such as a transaxle or rear axle, can utilize the sealed differential without the need to consider the flow of lubrication oil into and out of the differential. The differential will likely be better lubricated than it would be even with a well-designed lubrication system of the system. The designer of the system is free to use alternate fluids, which wouldn't necessarily be optimum for differential lubrication, in the system. Finally, the sealed differential could be used in an application in which it is not enclosed in an outer sealed housing at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A sealed differential comprising:
   a carrier housing defining a sealed cavity;

first and second stub shafts each supported for rotation with respect to the carrier housing;

gearing configured to constrain a speed of the first stub shaft with respect to the carrier housing to be equal in magnitude and opposite in direction to a speed of the second stub shaft with respect to the carrier housing; and a one-way valve configured to permit fluid to flow through the first stub shaft into the cavity and to block fluid flow from the cavity.

2. The sealed differential of claim 1 wherein the first and second stub shafts are both hollow and have internal spline teeth configured to rotationally couple the stub shafts with corresponding half shafts.

3. The sealed differential of claim 1 wherein the gearing comprises:

first and second sun gears fixed to the first and second stub shafts respectively;

a plurality of first planet gears supported for rotation with respect to the carrier housing, each first planet gear meshing with the first sun gear; and a plurality of second planet gears supported for rotation with respect to the carrier housing, each second planet gear meshing with the second sun gear and one of the first planet gears.

4. The sealed differential of claim 1 wherein the carrier housing comprises:

a first carrier half having an inner axial extension; and a second carrier half having an outer axial extension radially outside the inner axial extension, the first and second carrier halves being welded together with a circumferential weld between the first carrier half and a tip of the outer axial extension.

5. A sealed differential comprising:

a first carrier half having an inner axial extension;

a second carrier half having an outer axial extension radially outside the inner axial extension, the first and second carrier halves being welded together with a circumferential weld between the first carrier half and a tip of the outer axial extension;

first and second stub shafts each supported for rotation with respect to the first and second carrier halves;

gearing configured to constrain a speed of the first stub shaft with respect to the carrier halves to be equal in magnitude and opposite in direction to a speed of the second stub shaft with respect to the carrier halves; and a one-way valve, wherein:

the first and second carrier halves and the first and second stub shafts define a cavity; and the one-way valve is configured to permit fluid to flow through one of the first and second stub shafts into the cavity and to block fluid flow from the cavity.

6. The sealed differential of claim 5 wherein the first and second stub shafts are both hollow and have internal spline teeth configured to rotationally couple the stub shafts with corresponding half shafts.

7. The sealed differential of claim 5 wherein the gearing comprises:

first and second sun gears fixed to the first and second stub shafts respectively;

a plurality of first planet gears supported for rotation with respect to the first carrier half, each first planet gear meshing with the first sun gear; and a plurality of second planet gears supported for rotation with respect to the second carrier half, each second planet gear meshing with the second sun gear and one of the first planet gears.

8. A method of assembling a differential comprising:

installing a first stub shaft in a first carrier half in a manner that creates a first seal but permits relative rotation;

installing a second stub shaft into a second carrier half in a manner that creates a second seal but permits relative rotation;

installing gearing which constrains the first and second stub shafts to rotate in opposite directions at equal speeds with respect to the respective carrier halves;

welding the first carrier half to the second carrier half to define a sealed closed cavity; and partially filling the sealed cavity with fluid via a one-way valve in the first stub shaft.

9. The method of claim 8 wherein the gearing comprises:

first and second sun gears fixed to the first and second stub shafts respectively;

a plurality of first planet gears supported for rotation with respect to the first carrier half, each first planet gear meshing with the first sun gear; and a plurality of second planet gears supported for rotation with respect to the second carrier half, each second planet gear meshing with the second sun gear and one of the first planet gears.

10. The method of claim 8 wherein:

the first carrier half has an inner axial extension;

the second carrier half has an outer axial extension radially outside the inner axial extension; and the weld is between the first carrier half and a tip of the outer axial extension.

\* \* \* \* \*